US010397662B1

(12) United States Patent
Bulusu et al.

(10) Patent No.: US 10,397,662 B1
(45) Date of Patent: Aug. 27, 2019

(54) GENERATING LIVE BROADCASTS OF PRODUCT USAGE FROM MULTIPLE USERS

(71) Applicant: Amazon Technologies, Inc., Seattle, WA (US)

(72) Inventors: Prakash Bulusu, Bangalore (IN); Pragyana K. Mishra, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 73 days.

(21) Appl. No.: 15/586,631

(22) Filed: May 4, 2017

(51) Int. Cl.
| | |
|---|---|
| *H04N 7/16* | (2011.01) |
| *H04N 21/81* | (2011.01) |
| *H04N 21/2187* | (2011.01) |
| *H04N 21/84* | (2011.01) |
| *H04N 21/4223* | (2011.01) |
| *H04N 21/234* | (2011.01) |

(52) U.S. Cl.
CPC ........ *H04N 21/812* (2013.01); *H04N 21/2187* (2013.01); *H04N 21/234* (2013.01); *H04N 21/4223* (2013.01); *H04N 21/84* (2013.01)

(58) Field of Classification Search
CPC ........ G06Q 10/00; G06Q 10/06; G06Q 10/08; G06Q 10/87; G06Q 20/203; G06Q 30/0223; H04N 2201/3205; H04N 2201/3226; H04N 7/18; G06K 17/0022; G06K 7/14

See application file for complete search history.

(56) References Cited

U.S. PATENT DOCUMENTS

| | | | | |
|---|---|---|---|---|
| 9,747,677 | B2 * | 8/2017 | Clayton | G06T 5/50 |
| 2006/0173756 | A1 * | 8/2006 | Benight | G06Q 10/087 |
| | | | | 705/28 |
| 2009/0121017 | A1 * | 5/2009 | Cato | G06Q 10/087 |
| | | | | 235/385 |
| 2009/0171748 | A1 * | 7/2009 | Aven | G06Q 30/02 |
| | | | | 705/14.54 |
| 2012/0150754 | A1 * | 6/2012 | Belady | G06Q 10/30 |
| | | | | 705/308 |
| 2012/0179665 | A1 * | 7/2012 | Baarman | G06F 19/3475 |
| | | | | 707/709 |
| 2012/0265644 | A1 * | 10/2012 | Roa | G06Q 30/0643 |
| | | | | 705/26.61 |
| 2012/0327226 | A1 * | 12/2012 | Pineau | H04N 7/181 |
| | | | | 348/143 |
| 2013/0054310 | A1 * | 2/2013 | Sickenius | G06Q 30/02 |
| | | | | 705/7.39 |

(Continued)

*Primary Examiner* — Jason P Salce
(74) *Attorney, Agent, or Firm* — Eversheds Sutherland (US) LLP

(57) ABSTRACT

Systems, methods, and computer-readable media are disclosed for generating live broadcasts of product usage from multiple users. In one embodiment, an example method may include determining a product identifier of a product for which a product lifecycle video is to be generated, determining a first camera to use for capturing a first portion of a video of the product, where the first portion corresponds to a first lifecycle stage of the product, and capturing the first portion. Example methods may include determining a second camera to use for capturing a second portion of video of the product, where the second portion corresponds to a second lifecycle stage of the product, capturing the second portion, and causing presentation of the video.

19 Claims, 8 Drawing Sheets

(56) References Cited

U.S. PATENT DOCUMENTS

| | | | |
|---|---|---|---|
| 2013/0054357 A1* | 2/2013 | Mager | G06Q 30/02 |
| | | | 705/14.49 |
| 2013/0069781 A1* | 3/2013 | Terwilliger | G06Q 10/08 |
| | | | 340/539.13 |
| 2013/0093897 A1* | 4/2013 | Fan | H04N 7/181 |
| | | | 348/159 |
| 2013/0113930 A1* | 5/2013 | Sickenius | G08B 13/19606 |
| | | | 348/143 |
| 2014/0068445 A1* | 3/2014 | Kempf | G06Q 10/06312 |
| | | | 715/736 |
| 2014/0129378 A1* | 5/2014 | Richardson | G06Q 30/0639 |
| | | | 705/26.8 |
| 2014/0172570 A1* | 6/2014 | Arcas | H04W 4/043 |
| | | | 705/14.58 |
| 2014/0211019 A1* | 7/2014 | Choi | H04N 7/181 |
| | | | 348/159 |
| 2015/0142686 A1* | 5/2015 | Baldwin | G06Q 50/265 |
| | | | 705/325 |
| 2015/0269549 A1* | 9/2015 | Herring | G06Q 20/203 |
| | | | 705/18 |
| 2016/0034907 A1* | 2/2016 | Worrall | G06Q 30/018 |
| | | | 705/317 |
| 2016/0034988 A1* | 2/2016 | Howard | G06F 3/1446 |
| | | | 348/143 |
| 2017/0061449 A1* | 3/2017 | Bande | G06Q 30/0201 |
| 2017/0098175 A1* | 4/2017 | Norby | G06Q 10/02 |
| 2017/0147966 A1* | 5/2017 | Aversa | G06Q 10/087 |
| 2017/0277947 A1* | 9/2017 | Burke | G06K 9/00496 |

* cited by examiner

GENERATING LIVE BROADCASTS OF PRODUCT USAGE FROM MULTIPLE USERS

BACKGROUND

Digital content, such as images and videos, may be presented, streamed, or broadcast to user devices. Users may consume the digital content using any number of devices. The digital content may be user-generated or crowdsourced content that is created by another user using a camera device. For example, a user may record video of activities the user is engaging in and may share the video as a digital story with other users. Digital content may be captured in real-time and/or may be recorded and shared at later instances. Some users may desire to consume streams of content in real-time during a number of different content consumption sessions. Accordingly, some users may desire to consume real-time or recorded content from one or more users or camera devices at different times during a broadcast, streaming, or other content presentation session.

Figure 1:
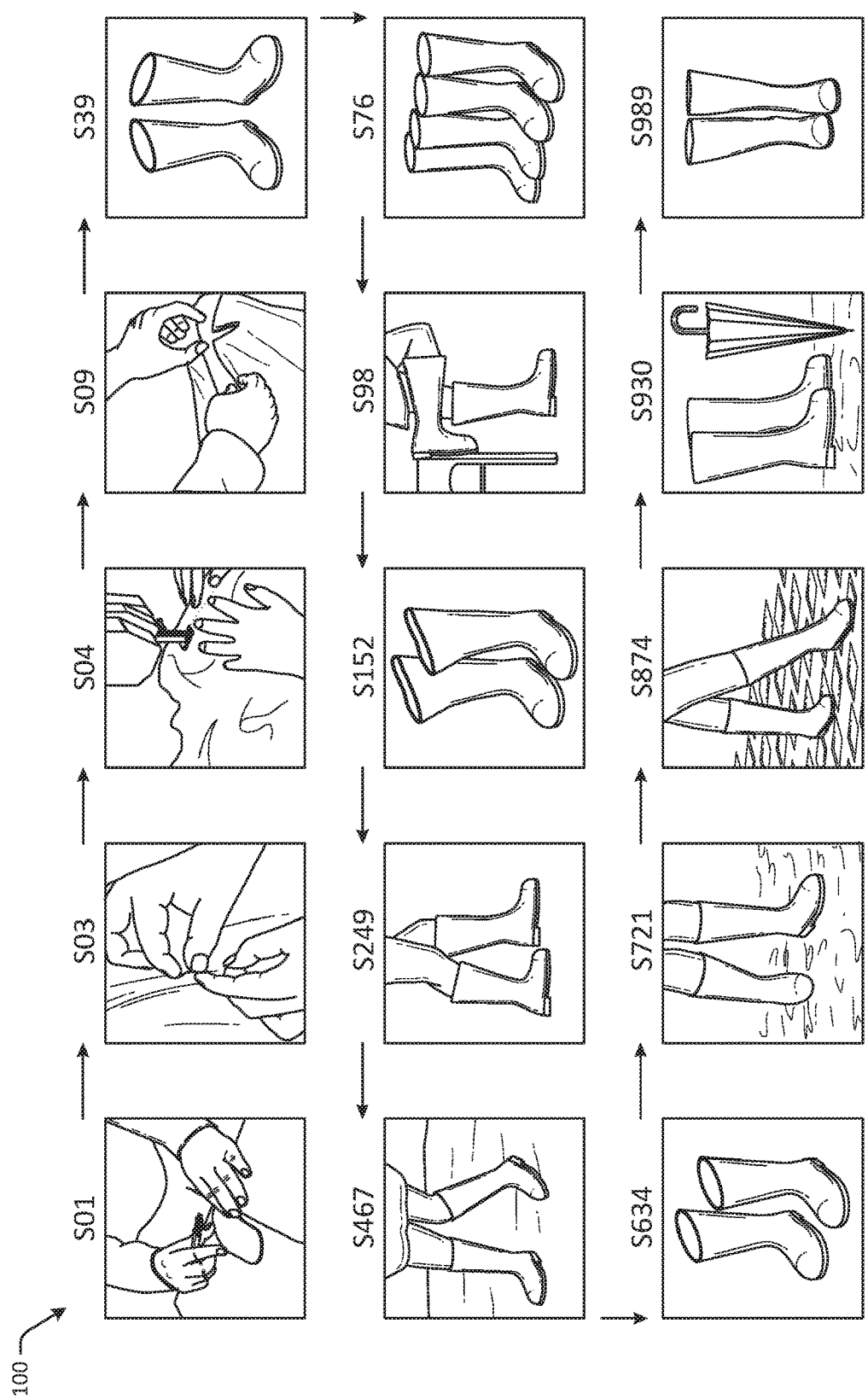
FIG. 1 is a schematic drawing of a number of frames of a product usage broadcast from multiple users in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar but not necessarily the same or identical components; different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Digital content may be presented at electronic devices, such that users of the electronic devices may consume the digital content. Content for delivery may include content such as text, images, videos, audio, and other content. Some content may include images of particular products, as well as additional product related information. Content of a particular product or using a particular device, such as a camera, may be livestreamed or otherwise captured and/or stored for presentation. For example, a camera on a cruise ship may livestream or broadcast a portion of the cruise ship or an ambient environment. Users may access the broadcast or livestream on a device and may consume the content that is being streamed from the camera on the cruise ship. Certain users may find such broadcasts or livestreams entertaining and may desire to check in on the cruise ship and/or the camera over several days. In some instances, users may desire to consume content that captures a particular product in various stages, such as in a production or manufacturing stage, to an in-use stage, to an end of life stage, and so forth. Products may progress through a lifecycle that includes any number of stages. Some or all of the life cycle stages may be broadcast or captured in a video for consumption by users in real-time and/or stored for later consumption. Such broadcasts or content may allow or assist users in viewing products that are used by actual consumers, rather than advertisements, and may drive user engagement and/or preferences for certain products and/or brands. For example, users that can see the sourcing of products, such as food products, may be more inclined to purchase such products, as opposed to other products for which such viewing functionality is unavailable.

Embodiments of the disclosure may generate and/or create content that can be livestreamed and/or broadcasted, or stored and processed for later presentation, where the content may be real-time or long-form content (e.g., if the length of the content is 8 hours, the content includes a content stream from one or more cameras that covers 8 consecutive hours of a product or other content, etc.). Some embodiments may include content that has been processed or shortened so as to highlight certain events in a product lifecycle, where the content may be a stream of content of a product from one or more cameras, but a speed of playback has been adjusted for various portions of the content, so as to highlight or bring certain portions of the content to a user's attention. Some users may be interested in a source of a product, and certain embodiments may provide livestream or broadcast video of a product in production or at a source location. Location may reference a part of a facility or building, such as a section of a factory or particular portion of a manufacturing line, or a kitchen, backyard, or bedroom in a home, as well as a geographic region, which may be determined by geographic coordinates.

As products change hands and/or owners, embodiments of the disclosure may update a camera from which content is captured for streaming. For example, after a product is manufactured, a subsequent owner of the product may be a retailer that sells the product. The retailer may have one or more camera devices that can be used to capture the product during the retail process. After a consumer purchases the product, a subsequent owner may be a consumer, and the consumer may capture content related to the product in use.

Owners may correspond to certain stages of a product lifecycle. Embodiments of the disclosure may determine a current owner of a product, as well as camera devices associated with the respective owners, and may use the appropriate camera devices to capture content. In some embodiments, users or owners of products may be incentivized to broadcast content of a product by attributing purchases or portions of purchases to users the broadcast content that results in a sale or conversion of the product. In some embodiments, attribution may be shared across previous broadcasters or owners. For example, attribution may be shared across different aspects of a manufacturing process. In one example, for cherry pie, attribution may be shared across broadcasts from a farmer that grows and pick cherries, a processing facility that washes cherries, and a packaging facility or area of a facility that packages cherries for shipment to a bakery. Attribution may be determined, in some instances, based at least in part on a change to a propensity to purchase for viewers of a broadcast.

By using the systems and methods described herein, content can be livestreamed, broadcast, and/or shared with other users. Content can be generated by more than one user and/or camera device, and can be shared and/or consumed in real-time or after content is captured. In some embodiments, content of a particular product may be accessible and/or sorted based at least in part on a product lifecycle stage of the product that appears in the content. Content that is captured may be long-form, or may have a length that corresponds to the amount of time that passed in real life while the content was captured.

Certain embodiments may provide digital platforms that can be used to access content, such as broadcasts or livestreams, of certain products in various lifecycle stages. A number of viewers or subscribers to a broadcast or livestream, or related source, may be used for purchase attribution. In some embodiments, users may be notified when a product that the user ordered is being manufactured or is in any particular lifecycle stage.

This disclosure relates to, among other things, systems, methods, computer-readable media, techniques, and methodologies for generating live broadcasts of product usage from multiple users. Embodiments may determine one or more owners of a particular product or type of product, as well as cameras or other electronic devices associated with the respective one or more owners. Certain embodiments may use camera devices to generate content streams, or may receive content streams from camera devices, that can be broadcast to one or more user devices. Certain embodiments may segment, process, and/or filter content for selection and/or presentation based at least in part on a product's lifecycle stage presented in the content. Users may access one or more content streams or broadcasts from a platform that may be configured to facilitate purchases of one or more products that appear in certain content.

Referring to FIG. 1, an example use case 100 for generating live broadcasts of product usage from multiple users is depicted in accordance with one or more embodiments of the disclosure. The example use case 100 may include a number of frames of a product usage broadcast from one or more, or multiple, users. The use case 100 of FIG. 1 may be for a pair of boots that are broadcast or livestreamed over various product lifecycle stages, starting from a manufacturing lifecycle stage to a heavily used lifecycle stage. The example frames illustrated in FIG. 1 may be accessed by any number of users on any number of devices, and may be in chronological order. For example, frame S01 may occur before frame S989 in the example of FIG. 1.

Users, such as consumers of products, may desire to learn more about how certain products are produced, consumed, and/or disposed. Accordingly, users may access content streams or broadcasts of the products at various stages in the product lifecycle, where the content is captured by or broadcast from different users that own or are in possession of the product. Such broadcasts may be effective in informing users of the processes and resources involved in producing a product, the product's longevity and/or rate of consumption, and other information.

Broadcasts or livestreams of products may last, for example, for extended periods of time, such as hours, days, and weeks, and can be generated and/or contributed to by any number of users or owners of a product. The broadcasts and/or content generated by systems of the disclosure may provide a view of a certain product's lifecycle from the viewpoint of various owners or users that possess the product at different times.

For example, at frame S01, which may be a first frame in a content stream or broadcast, a manufacturer of a pair of boots may have a camera or camera device that captures video of the pair of boots being manufactured. The manufacturer may be a first "owner" or a first user in possession of the pair of boots, and may be associated with a manufacturing product lifecycle stage. The manufacturer may have or be associated with, for example, one or more camera devices, such as mobile device cameras, mobile cameras, miniature cameras and video transmitters, WiFi cameras, internet of things cameras, and other devices configured to capture content, such as images, sounds, and/or video of a product. The camera(s) may be oriented along an assembly line or other manufacturing process location and may be configured to capture and/or stream content.

As illustrated in the example of FIG. 1, frames S01 through S39 may correspond to a manufacturing or production lifecycle stage for the pair of boots. The content of frames S01 through S39 may be broadcast and/or otherwise accessible as a content "channel" that may be available on one or more online platforms and/or other internet-based content streaming services.

After the manufacturing product lifecycle stage is complete, the pair of boots may be shipped to a retailer. In some instances, a second owner may be a transporter of the pair of boots, and may be associated with a camera device that is inside a trailer or cargo holding that portrays the pair of boots during shipment.

In some instances, the retailer may be a subsequent owner of the pair of boots, and may broadcast the pair of boots during a product sale lifecycle stage. For example, the pair of boots may be depicted as they are placed on a shelf for sale, tried on by various potential buyers, and the like. Frames S76 through S249 illustrate example frames captured during a sale lifecycle stage.

A consumer may be a subsequent owner of the boots and may broadcast themselves using the boots after making the purchase. For example, as illustrated in frames S467 through S989, the consumer may buy the boots from the retailer, and may broadcast themselves wearing the boots and/or otherwise using the product over time. The consumer may broadcast themselves walking in the rain, out on the town, and during other instances where the boots are in use or are being stored. The consumer may capture video or content using a mobile device, such as a smartphone or tablet, while the consumer is using the product. For example, the consumer may capture a short video that includes frames S721 through S874 of the consumer walking in the rain with the boots. The consumer may have more than one camera device that can be used to capture content with the product. For example, the boots may be on a shelf at a home location of the user and may be captured during storage by a wall mounted camera, for example. When the consumer removes the boots from storage, such as by putting them on and/or moving them from the shelf, another camera device may be activated, such as the consumer's smartphone, so as to continue broadcasting the boots. In some embodiments, a determination may be made that the product has been removed from storage, for example via motion detection, pattern recognition, an indication from a user device (e.g., the consumer may start broadcasting using the smartphone or another device, etc.) or via another other process. If the product has been removed from storage, another camera device may be used to continuously or sporadically broadcast the product. The first camera, which may be the wall mounted camera in this example, may then be deactivated and/or a stream from the wall mounted camera may be discarded for broadcasting the pair of boots (the wall mounted camera could still broadcast other products, however). When the boots are returned to stored, the wall mounted camera may be returned to an active state for broadcasting of the pair of boots. Once the consumer has decided to get rid of the boots, or the boots have otherwise reached an end of life product lifecycle stage, live video streams of the product may end.

As the product changes hands, for example, from the retailer to the consumer, an owner of the product (and the associated camera devices) may be updated so as to capture content from multiple users or owners that pertain to various product lifecycle stages. As a result, other users can view or consume content relating to a particular product throughout some or all of the product lifecycle.

For different products, cameras may be stationary or mobile, and more than one camera may be used to broadcast content of a product. For example, if the product is a pint of ice cream, a first camera may be inside a freezer, and another camera, such as a smartphone camera, may be used by a user to broadcast the user consuming the ice cream. Therefore, owners of a product may be associated with more than one camera device that may be used to broadcast content of the product.

Broadcasted or streamed video may be in real-time (e.g., 1 frame-per-second to 30 frames-per-second, etc.) for short-shelf-life products or it can be at a frame-a-day or more. Certain content may be captured and stored, rather than broadcast live. Such content may have varying frame rates, and may have been recorded over a relatively long length of time, such as a preceding year, in real-time (but with a long lag time and not streaming). The frame rate and the total duration of the content may be determined based at least in part on a rate of consumption of the product, an expected shelf life of the product, durability of the product, and/or other factors.

Certain embodiments may capture and/or cause broadcasting of content streams of certain portions, or all, of a product lifecycle of a product or collection of products, and may generate a seamless narrative that depicts the progress of events that span across the lifespan of the item or collection of items. Such broadcasts or content may be different than video summarization techniques, because certain embodiments may not use low-level cues such as motion, edges, or blobs of color to select a series of key frames for highlighting or inclusion in a video. Some embodiments may determine or select events that affect the lifecycle progression of a product (e.g., progression from retail to consumer, progression from consumer to end of life stage, etc.). Some embodiments may include salient and/or short sub-events, such as transit of the product to a retailer, and may include what may otherwise be idle time, such as content depicting the product in storage or during periods of non-use.

Some embodiments may use data and/or information related to how products age or get consumed, and may produce or generate a content summary that includes frames and regions that are relevant to the consumption or aging of a product. Such information may include visual recognition of the product over time (e.g., detection, classification, tracking, etc.), visual cues (e.g., shape/silhouette changes, histogram of color, count or visual dimensions of its content, image features, etc.), estimated product longevity (e.g., observed average, minimum lifespan, maximum lifespan, etc.), aging and/or consumption rate (e.g., average rate of consumption, degradation, perishability, etc.), lifecycle process information, and the like.

Products may be tracked throughout some or all of the product's lifecycle stages, and footage or video of the product in some or each of the lifecycle stages may be captured from multiple users or owners of the product. Owners may include craftsmen, manufacturers, warehouse store associates, salesmen/saleswomen, buyers, various consumers, consignment store associates, and other owners. Some products may be handled by many owners over the product's life. Certain embodiments may encourage or incentivize current owners to capture content of the product by determining real-time attribution of product sales to owners that broadcast or stream a product. Attribution of purchases of a product that is broadcast or livestreamed may be associated with specific segments of the broadcasted content, which may include a current segment, as well as the preceding segments. The prolonged and continuous broadcast may be used for continuous attribution, which may attribute new purchases of the product to a particular stage of its life (and optionally to the preceding stages).

Other example products and related broadcasts or livestream content may include, but are not limited to, content portraying food products as they are manufactured and packaged, sold in a supermarket, and then eaten over days or weeks.

The systems, methods, computer-readable media, techniques, and methodologies for generating live broadcasts of product usage from multiple users may result in content broadcasts or livestreams, or content generation, from multiple user devices and/or users that can be used to view products over the product's lifecycle. In some embodiments, attribution of product sales of a product that is being broadcast or livestreamed may be determined based at least in part on current broadcasters of the product and/or previous broadcasters of the product.

Example embodiments of the disclosure provide a number of technical features or technical effects. For example, in accordance with example embodiments of the disclosure, certain embodiments of the disclosure may control operations at multiple camera devices, determine current owners of products, collect and/or cause content streams to be broadcast and/or generated, and may determine purchase attribution metrics. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative Processes and Use Cases

Figure 2:
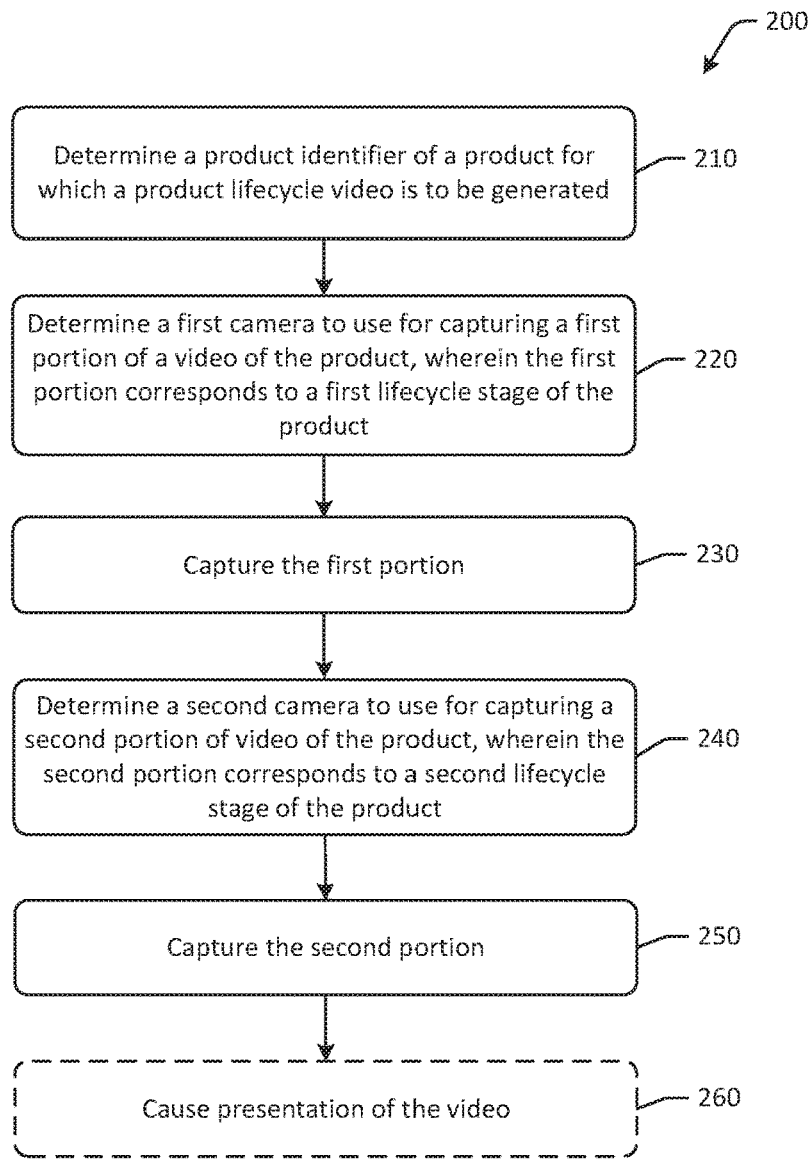
FIG. 2 is an example process flow diagram for generating live broadcasts of product usage from multiple users in accordance with one or more embodiments of the disclosure.

Referring to FIG. 2, an example process flow 200 for generating live broadcasts of product usage from multiple users in accordance with one or more embodiments of the disclosure is depicted. Although certain operations are illustrated as occurring separately in FIG. 2, some or all of the operations may occur concurrently or partially concurrently across one or more computer systems. One or more operations may be optional in FIG. 2.

At block 210 of the process flow 200, a product identifier of a product for which a product lifecycle video is to be generated may be determined. For example, a product manufacturer may indicate at a user device a product identifier for a product for which a product lifecycle video is to be generated, or of a product for which to broadcast a product lifecycle video stream. In some embodiments, the product lifecycle video may be initiated by a consumer or other user of the product. The product may be identified, for example, via a serial number, product identification number, scannable or machine readable code, and the like. In one embodiment, computer-executable instructions of one or more content streaming module(s) stored at a server may be executed to receive an indication of a product identifier of a product for which a product lifecycle video is to be generated. The server may determine that a product lifecycle video is to be initiated and may facilitate initiation of the product lifecycle video, which may be a video, a broadcast, a live video stream or livestream, or other form of content that can be consumed by users.

At block 220 of the process flow 200, a first camera to use for capturing a first portion of a video of the product may be determined, where the first portion corresponds to a first lifecycle stage of the product. The first portion may correspond to a manufacturing lifecycle stage of the product, an in use lifecycle stage, or another lifecycle stage of the product. For example, computer-executable instructions of one or more content streaming module(s) stored at a server may be executed to determine a set of one or more cameras that are associated with a user identifier of the user that desires to broadcast or stream content of the product. For example, the manufacturer of the product may be associated with camera devices that are positioned along assembly lines of the product, or a consumer may be associated with a camera smartphone, a GoPro camera, and/or another camera device. User identifiers may be associated with one or more camera devices. The camera devices may be associated with camera device identifiers which can be used to determine which cameras are eligible or otherwise available to broadcast or capture content of the product for which the product lifecycle video is being generated. Based at least in part on the user identifier and/or the associated camera devices, a first camera to capture a portion of the lifecycle video for the product may be identified and, in some instances, activated so as to capture or broadcast/stream content that includes the product. The streamed content may be associated with a particular lifecycle stage of the product, which may be determined automatically or by the user associated with the camera that is capturing the content (e.g., user may indicate whether the product is being manufactured, used, discarded, etc.).

At block 230 of the process flow 200, the first portion may be captured. For example, computer-executable instructions of one or more content streaming module(s) stored at a server may be executed to initiate the first camera, or to request that the first camera initiate capturing of content. In some embodiments, the first camera may be controlled, at least partially, by the server, while in other embodiments, the server may request permission to access content that is captured by the first camera. Content that is received from the first camera may be streamed to other devices of users that desire to consume the content, and may be available at an online platform that may include digital channels. In some embodiments, the content received from the first camera may be stored for processing, for example, after the product is discarded at a later time.

At block 240 of the process flow 200, a second camera to use for capturing a second portion of video of the product may be determined, where the second portion corresponds to a second lifecycle stage of the product. For example, after the product is manufactured, the product may be shipped to a consumer, and the consumer may indicate that the product has been received, and that the product is now in an in-use product lifecycle stage. The camera devices associated with the manufacturer may be deactivated or otherwise no longer used to capture video of the product, and camera devices that are associated with the consumer may be activated as potentially being used to capture content with the product. For example, the consumer may have a smartphone device, a tablet device, a security camera, and/or other camera devices that may potentially be used to capture video of the product. In one embodiment, computer-executable instructions of one or more content streaming module(s) stored at a server may be executed to update or change the current owner of the product from the manufacturer to the consumer, and may also update or change the set of camera devices that are eligible to capture video of the product. The manufacturer and/or consumer may be able to indicate the change in ownership of the product using a user interface at a digital portal or application, in one example. Ownership of a product may indicate a user that is currently in possession of the product.

At block 250 of the process flow 200, the second portion of the video may be captured. For example, computer-executable instructions of one or more content streaming module(s) stored at a server may be executed to initiate the second camera, or to request that the second camera initiate capturing of content. In some embodiments, the second camera may be controlled, at least partially, by the server, while in other embodiments, the server may request permission to access content that is captured by the second camera. In another example, the user may decide when to broadcast or otherwise share content by, for example, initiating a mobile application on a smartphone device. Content that is received from the second camera may be streamed to other devices of users that desire to consume the content, and may be available at an online platform that may include digital channels. In some embodiments, the content received from the second camera may be stored for processing, for example, after the product is discarded at a later time.

At optional block 260, presentation of the video may be caused, or the video may be presented. For example, computer-executable instructions of one or more broadcast module(s) stored at a server may be executed to cause presentation of the content that is streamed from the first camera and/or second camera. The video may be broadcast or streamed in real-time, and may be accessible via one or more online platforms. In some embodiments, the camera devices may broadcast content directly to one or more user devices for users to consume the content, while in other embodiments, content may be relayed or sent to the server and then streamed or broadcasted to other user devices for consumption by users.

Figure 3:
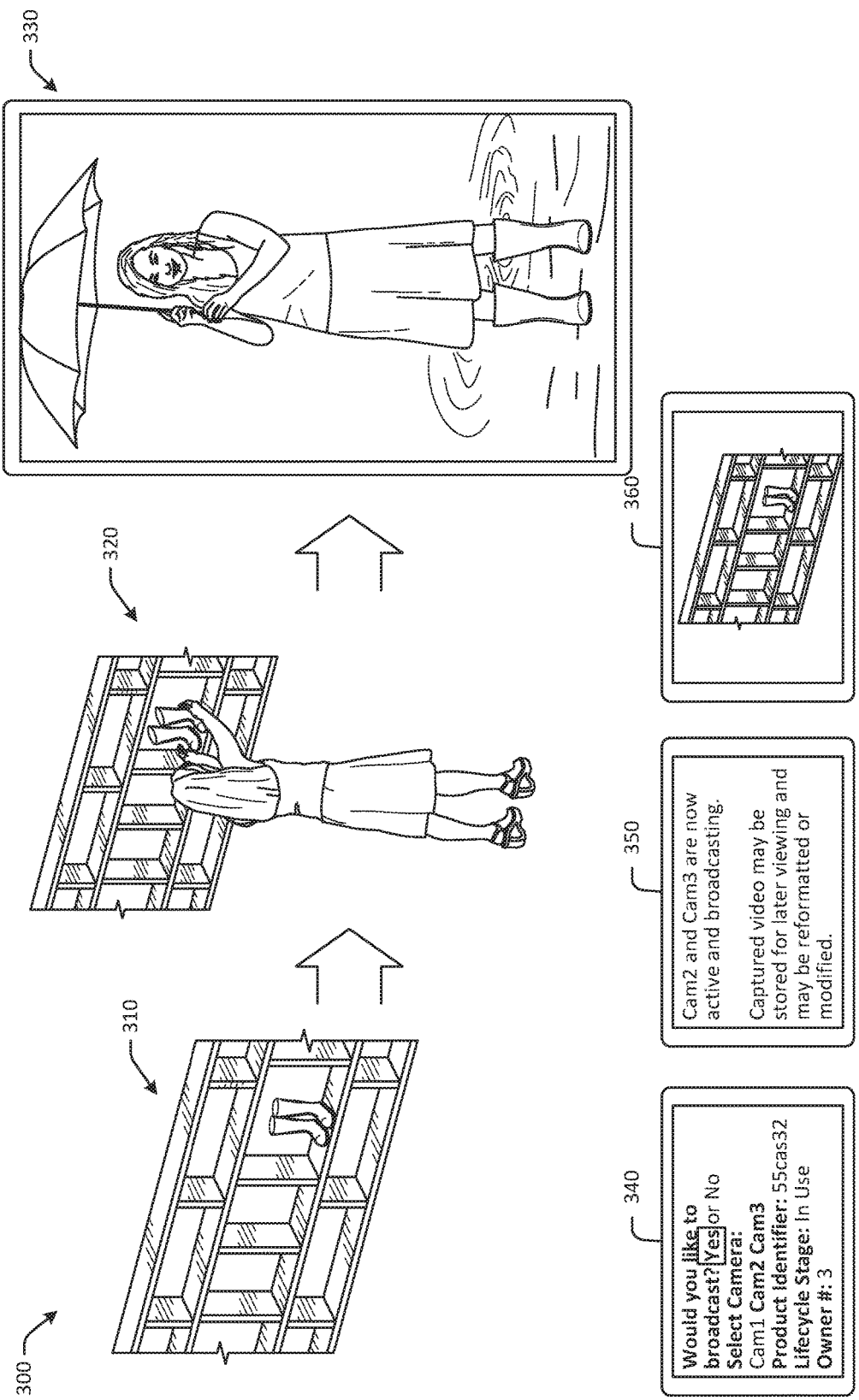
FIG. 3 is a hybrid use case and example user interface diagram for generating live broadcasts of product usage from multiple users in accordance with one or more embodiments of the disclosure.

FIG. 3 depicts a use case 300 and example user interface diagram for generating live broadcasts of product usage from multiple users in accordance with one or more embodiments of the disclosure.

In the example of FIG. 3, a consumer may purchase a pair of boots, such as the pair of boots in FIG. 1. The consumer may therefore be a subsequent owner of the pair of boots, or a second owner, where the first owner may have been the manufacturer or a retailer of the boots, in one example. The consumer may receive the boots, and may user a mobile application to control or initiate broadcasting or live streaming of the boots.

For example, the consumer may place the boots in storage on a shelf 310. At a first user interface 340, the user or the consumer may indicate that the user would like to broadcast or stream video of the pair of boots. The camera devices associated with the user may be presented for selection by the user. If the user selects the camera device, the camera device may be activated for potentially capturing video of the boots. In the example of FIG. 3, the user may select "CAM2" which may be a camera in the vicinity of the shoe storage shelf, and "CAM3" which may be a smartphone camera or another camera device. The user may identify the pair of boots, and indicate that the lifecycle stage for the pair of boots is "in-use." The consumer may be the third owner of the pair of boots, with the first being the manufacturer and the second being the retailer, in one example.

A second user interface 350 may confirm that the selected cameras are active and may be used to stream or broadcast content. A third user interface 360 may depict the content that is being streamed, which may be the pair of boots in storage 310.

The consumer may remove the pair of boots from storage at a later time 320, and may use the boots outdoors, as shown at 330. Accordingly, the camera in the storage location may not be able to stream the product outdoors. The consumer may use a smartphone or other device to capture images, videos, sounds, and other content while outdoors, and may stream or post such content to the feed of the pair of boots. For example, the consumer may capture an image of herself wearing the boots in the rain and may post the image or a short video clip as part of the broadcast or stream for the pair of boots.

Accordingly, users that desire to consume the product lifecycle video of the pair of boots may watch as the boots are manufactured, sent to a retailer, purchased, and then used by a consumer over time. Details that may otherwise seem unimportant, such as the pair of boots in storage, may be captured to provide a complete or relatively more complete picture of the boots lifecycle than may otherwise be available.

Figure 4:
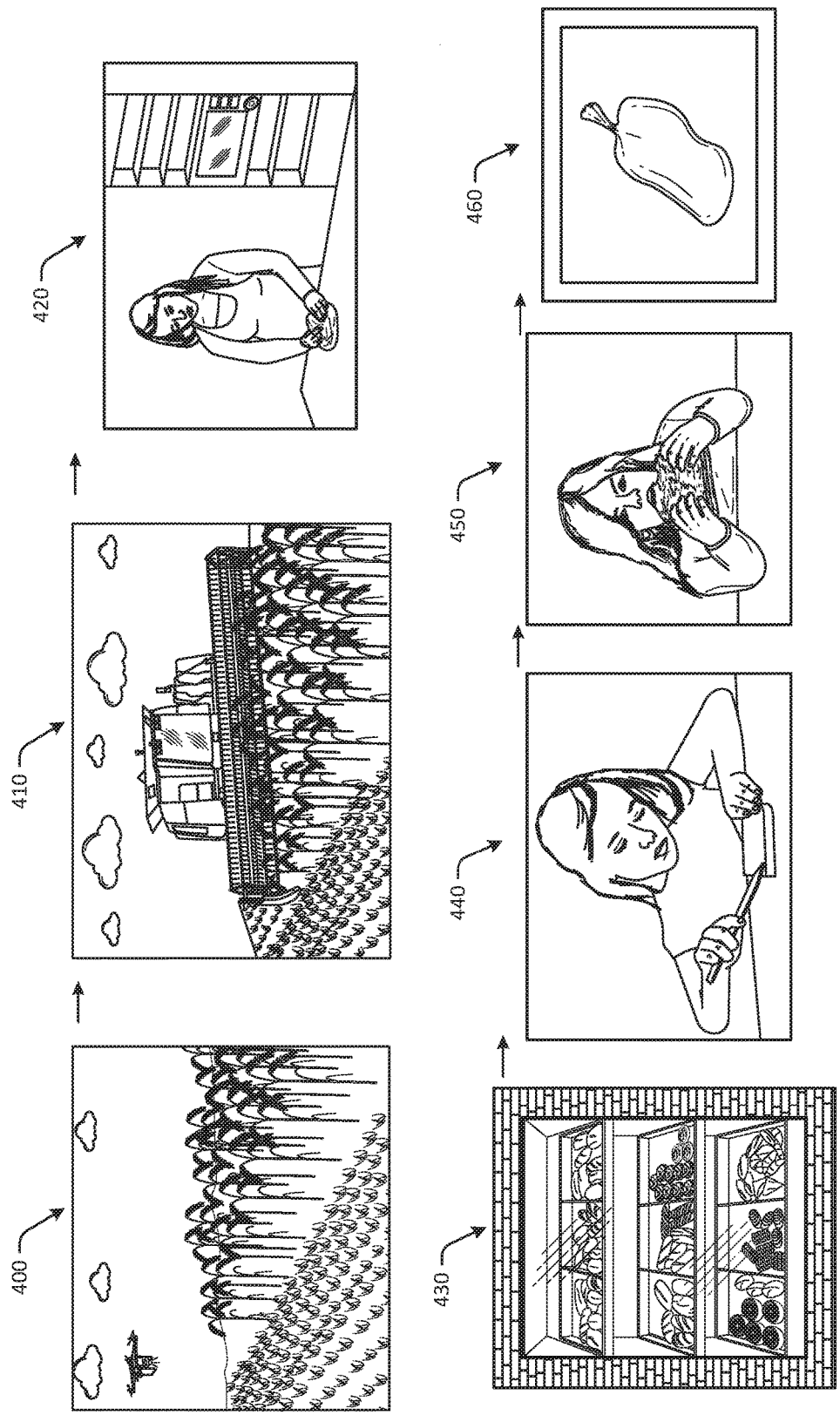
FIG. 4 is a schematic drawing of a number of frames of a product usage broadcast from multiple users in accordance with one or more embodiments of the disclosure.

FIG. 4 is a schematic drawing of a number of frames of a product usage broadcast from multiple users in accordance with one or more embodiments of the disclosure. Product lifecycle videos may be captured over relatively long lengths of time and by multiple users. The product lifecycle videos may be broadcasts or streams that capture various stages of the product over its lifecycle, which may be consumed by users that are interested in the product's uses, longevity, durability, sourcing, and other information.

For example, in FIG. 4, the product may be a loaf of bread. At a first product lifecycle stage, the bread may be wheat that is growing. Users may be interested in seeing the source of the wheat and/or the growing conditions. Accordingly, a farmer or manufacturer may stream video of the wheat growing. At a first frame 400, a drone with a camera may be used to capture video of the wheat growing, where the wheat will be made into a loaf of bread. The content from the drone may be broadcast as a first live video stream of video from a first camera at the drone. The first frame 400 may correspond to a wheat growing stage that is one of multiple portions of a manufacturing lifecycle stage of the organic bread in this example. Other content or broadcasts for the manufacturing lifecycle stage of the organic bread may include water, yeast, and other components that may be used to produce a final product that is ready for retail. For example, live streams of a water treatment facility that produces water for the organic bread may be available, along with a sugar production plant or other components that may be used to produce the organic bread, in this example.

At a second frame 410, as the wheat grows and is ready for harvesting, the harvesting process may be captured by the drone or by another camera device associated with the farmer or manufacturer. In some embodiments, the camera used to capture the wheat or at least a portion of the content may be determined or selected based at least in part on a manufacturer location that is determined using the first owner identifier of the farmer or manufacturer.

At a third frame 420, the wheat may be sent to a bakery after harvesting and/or processing. A baker may receive the wheat and may process the wheat into bread. When the bakery receives the wheat, the bakery may be designated as the new or current owner of the wheat, and cameras associated with the bakery may be activated for use to capture the wheat and/or products created from the wheat. For example, a server may determine that the product has been removed from the manufacturer location based at least in part on the harvesting event or an indication by the farmer, baker, or other user. In some embodiments, transfer of ownership of the product may indicate that a certain lifecycle stage is complete.

A second user identifier for a second owner of the product, which may be the bakery or baker, may be determined, and may be used to determine or select cameras that can be used to capture the process of converting the wheat into bread. The captured content may be live streamed and/or broadcasted to other users or otherwise made available for consumption in real-time or near real-time.

At a fourth frame 430, a camera may be used to stream content related to the retail process for the wheat that has been converted into bread. For example, a security camera or another camera may be used to show the bread for sale.

At a fifth frame 440, the bread may have been sold to a consumer and the consumer may use the bread to make a sandwich. The owner may be updated to the consumer and the one or more cameras associated with the consumer may be used to stream content related to the bread. For example, at the fifth frame 440 and a sixth frame 450, the consumer may make and eat a sandwich using the bread. At a seventh frame 460, the bread may be finished or may reach an end of life stage in the product lifecycle and the wrapper may be thrown in the garbage, as shown in frame 460. Once the product has reached the end of its life or has been consumed, the broadcasts or streams may cease or may otherwise be canceled.

Figure 5:
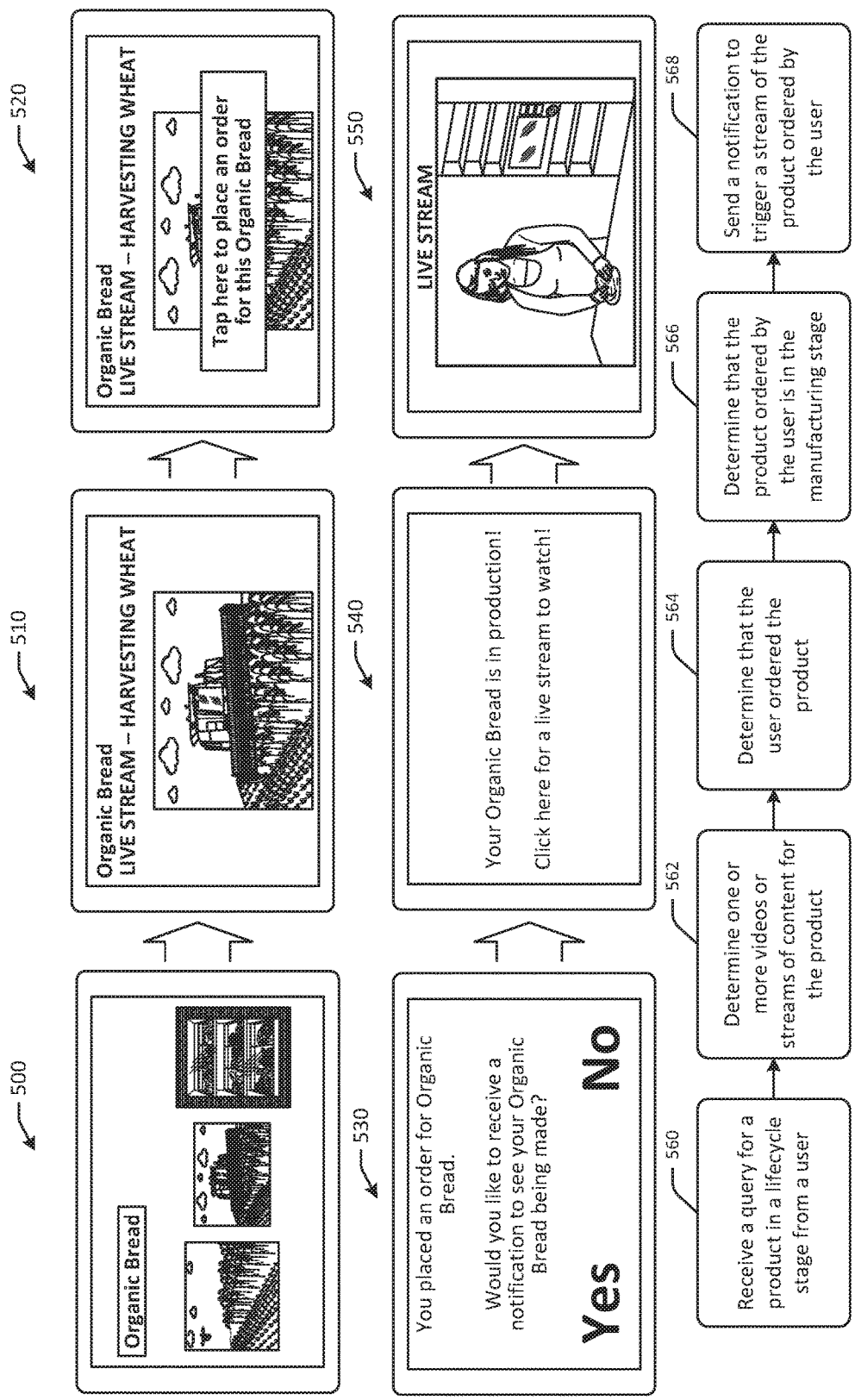
FIG. 5 is a hybrid system and process diagram for generating live broadcasts of product usage from multiple users in accordance with one or more embodiments of the disclosure.

FIG. 5 depicts a hybrid system and process diagram for generating live broadcasts of product usage from multiple users in accordance with one or more embodiments of the disclosure. The process flow may be used, in some embodiments, by one or more content broadcast servers to select content streams for presentation.

At block 560 of the process flow, a query for a product in a lifecycle stage may be received from a user. At block 562, one or more videos or streams of content for the product may be determined.

For example, as shown at first user interface 500, a query for "organic bread" may be received by one or more servers. The one or more remote servers may determine relevant videos or streams of organic bread, and may cause presentation of indications of those streams, as shown at the first user interface 500. The determined content streams may be presented in a certain order. For example, the content streams may be ranked and/or sorted based at least in part on a reputation associated with the owner or current broadcaster. In some embodiments, the determined set of broadcasts or videos may be sorted by lifecycle stage and a number of viewers of the respective broadcasts and videos. Reputation may be associated with the number of viewers or historical viewers.

At a second user interface 510, the user may select a broadcast or stream to watch or otherwise consume, and the broadcast or stream may be presented. Additional information, such as the lifecycle stage of the product shown in the stream, may be presented. At the second user interface 510, the organic bread may be shown in a harvesting wheat lifecycle stage.

In some embodiments, the user may be able to make purchases of products that appear in or are related to streaming content. For example, at a third user interface 520, the user may be able to order organic bread, which may be the product that is being livestreamed.

At a fourth user interface 530, the user may order the organic bread. An option to receive a notification that the organic bread ordered by the user is in production may be presented. Other options may include receiving a notification and/or automatically triggering a livestream or playback of content associated with changes in product lifecycle stage, when a product is in a particular lifecycle stage (e.g., retail stage, consumption stage, shipment stage, etc.), or other notifications that may be related to a change in ownership or usage of a product.

At block 564 of the process flow, a determination may be made that the user ordered the product and/or opted to receive a notification when the product was being manufactured. At block 566, a determination may be made that the product ordered by the user in is the manufacturing stage. At block 568, a notification to trigger a stream of the product ordered by the user may be sent to a user account.

For example, at a fifth user interface 540, the user may be notified that the organic bread ordered by the user is in production, and that the user can initiate a livestream of the production process. If the user decides to watch, at a sixth user interface 550, the content stream of the baker producing the organic bread may be presented at the user device.

To incentivize the baker, farmer, or other users in the examples of FIGS. 4 and 5 to broadcast the production of the bread, a number of purchases that occur during the respective broadcasts may be tracked and used to attribute to the various owners. The attributed purchases may be used to compensate owners for broadcasting. For example, in the example of FIG. 5, the farmer may have been broadcasting when the user selected the option to order the organic bread, and the purchase may be attributed, at least partially, to the farmer as a result of the broadcast.

In one embodiment, a set of user identifiers of users viewing a live video stream may be determined. The live video stream may be presented with the product identifier. A number of units of the product sold to user identifiers in the set of user identifiers during the live video stream may be determined, and a portion of the number of units may be attributed to the broadcasting owner identifier.

In another embodiment, a number of purchases of the product while the video is broadcast or captured may be determined and used for purchase attribution. Purchases may be attributed to a broadcasting user, as well as previous broadcasters of the product.

Figure 6:
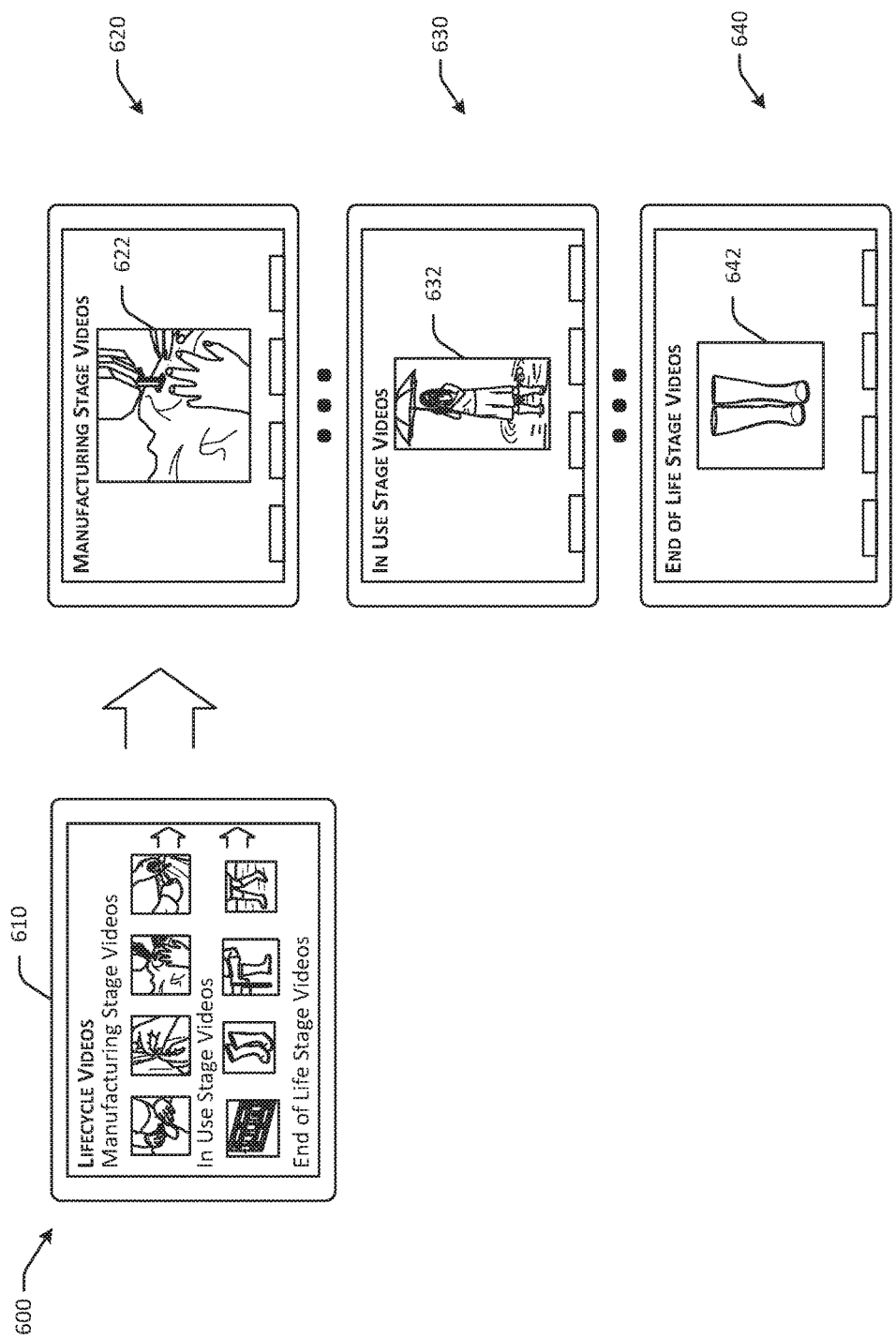
FIG. 6 is a schematic drawing of example user interfaces for selecting live broadcasts for consumption using an online platform in accordance with one or more embodiments of the disclosure.

FIG. 6 is a schematic drawing of example user interfaces 600 for selecting live broadcasts for consumption using an online platform in accordance with one or more embodiments of the disclosure.

In the example of FIG. 6, an online platform may be accessible at a first user interface 610 at one or more user devices. At the first user interface 610, users may search or query for broadcasts of particular products, such as food products, certain brands or manufacturers, and the like. The search results may be presented based at least in part on product lifecycle stages for the requested product. For example, content related to a manufacturing stage may be grouped together, content related to an in-use stage may be grouped together, content related to an end of life stage may be grouped together, and so forth. The content may be presented such that current live broadcasts are presented ahead of previously broadcast, or stored, content.

If the user selects videos in the manufacturing stage, at a second user interface 620, the selected broadcast 622 for the manufacturing of the product may be presented to the user. If the user selects a broadcast in the in-use stage, at a third user interface 630, the selected broadcast 632 may be presented as a separate channel. If the user selects a broadcast in the end of life stage, at a fourth user interface 640, the selected broadcast 642 may be presented as a separate channel. The user may navigate the online platform to see different product lifecycle stages of different products. If previously stored or broadcast videos are selected, the content may have been captured and stored during a live broadcast and then played back as a video file.

Figure 7:
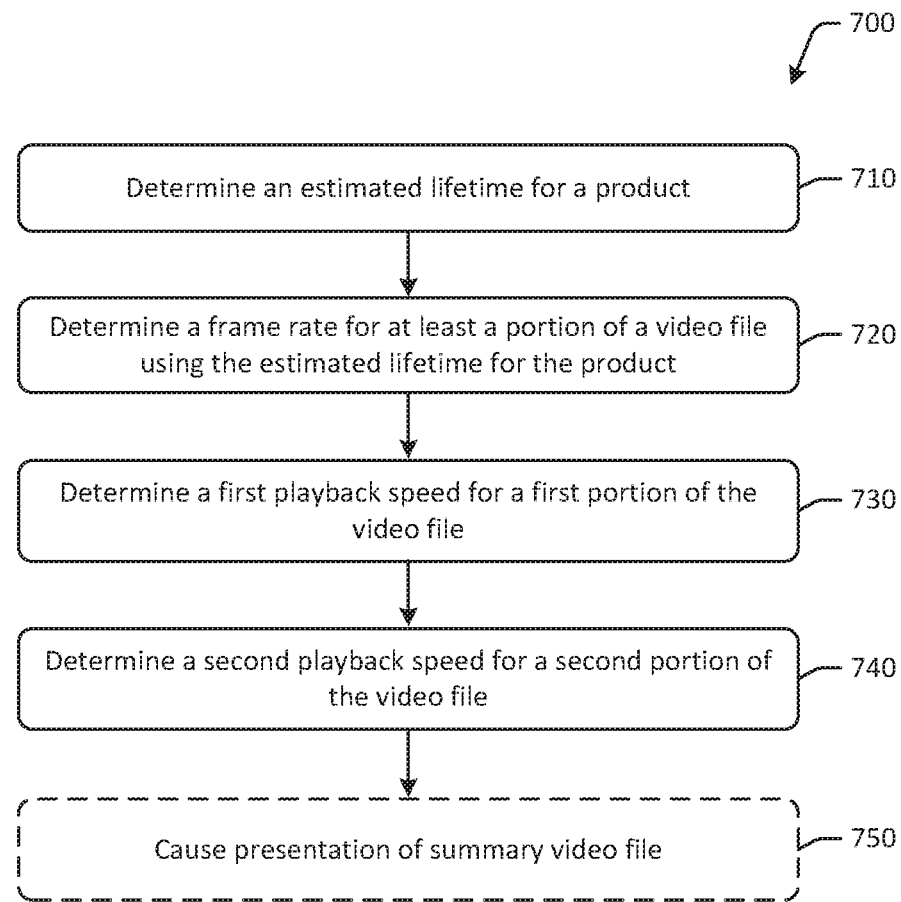
FIG. 7 is an example process flow diagram for generating video summaries in accordance with one or more embodiments of the disclosure.

FIG. 7 is an example process flow 700 for generating video summaries in accordance with one or more embodiments of the disclosure. After a product has reached the end of its lifecycle, the broadcasted or streamed content may be made available for playback to other users. Some embodiments may process the broadcasted content to generate a video summary highlighting key events or changes in status or condition of the product.

For example, at block 710, an estimated lifetime for a product may be determined. In some embodiments, an estimated product life may be determined. The estimated product life may be determined based at least in part on a frequency of reorders of the product by other users, previous broadcasts of the same or a similar product, and other factors. The estimated product life may be used to determine a duration of a video file for a summary video. For example, the duration of the video file may be equal to the estimated product life. In some instances, an estimated rate of consumption of the product may be determined and used to calculate the estimated product life.

At block 720, a frame rate for at least a portion of the video file may be determined. In one instance, based at least in part on the estimated product life and/or the estimated rate of consumption, a frame rate for at least a portion of the video file may be determined. For example, if the rate of consumption is very high during a particular portion of the product lifecycle, the frame rate may increase.

At block 730, a first playback speed for a first portion of the video file may be determined. The first playback speed may be based at least in part on the lifecycle stage associated with the first portion and/or the applicable frame rate. The first playback speed may be increased for less important events in the product lifecycle, such as storage, and decreased for more important events, such as consumer use.

At block 740, a second playback speed for a second portion of the video file may be determined. The second playback speed may be determined based at least in part on the lifecycle stage associated with the second portion and/or the applicable frame rate. The second playback speed may be increased for less important events in the product lifecycle, such as storage, and decreased for more important events, such as consumer use.

At optional block 750, presentation of the summary video file may be caused, or the summary video file may be otherwise presented.

In one example, a first playback speed for a first portion of the video file that corresponds to the manufacturing process of the product may be determined, and a second playback speed for a second portion of the video file that corresponds to storage of the product may be determined. The second playback speed may be greater than the first playback speed. A third playback speed for a third portion of the video file that corresponds to a change in appearance of the product, such as changes that occur after use of the product, may be determined, where the third playback speed is less than the second playback speed. The video file may be presented as a summary video of the video file using the frame rate, the first playback speed, the second playback speed, and the third playback speed.

Certain embodiments may segment a summary video based at least in part on lifecycle stages shown in the video. For example, a first portion of the video file corresponding to the manufacturing process of the product may be determined, a second portion of the video file corresponding to an on-sale process of the product may be determined, a third portion of the video file corresponding to an initial usage of the product may be determined, a fourth portion of the video file corresponding to an aging process of the product may be determined, and a fifth portion of the video file corresponding to an end of lifecycle stage of the product may be determined. The video file may be segmented by the first portion, the second portion, the third portion, the fourth portion, and the fifth portion.

One or more operations of the methods, process flows, or use cases of FIGS. 1-7 may have been described above as being performed by a user device, or more specifically, by one or more program module(s), applications, or the like executing on a device. It should be appreciated, however, that any of the operations of the methods, process flows, or use cases of FIGS. 1-7 may be performed, at least in part, in a distributed manner by one or more other devices, or more specifically, by one or more program module(s), applications, or the like executing on such devices. In addition, it should be appreciated that processing performed in response to execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-7 may be described in the context of the illustrative devices, it should be appreciated that such operations may be implemented in connection with numerous other device configurations.

The operations described and depicted in the illustrative methods, process flows, and use cases of FIGS. 1-7 may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-7 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Computer Architecture

Figure 8:
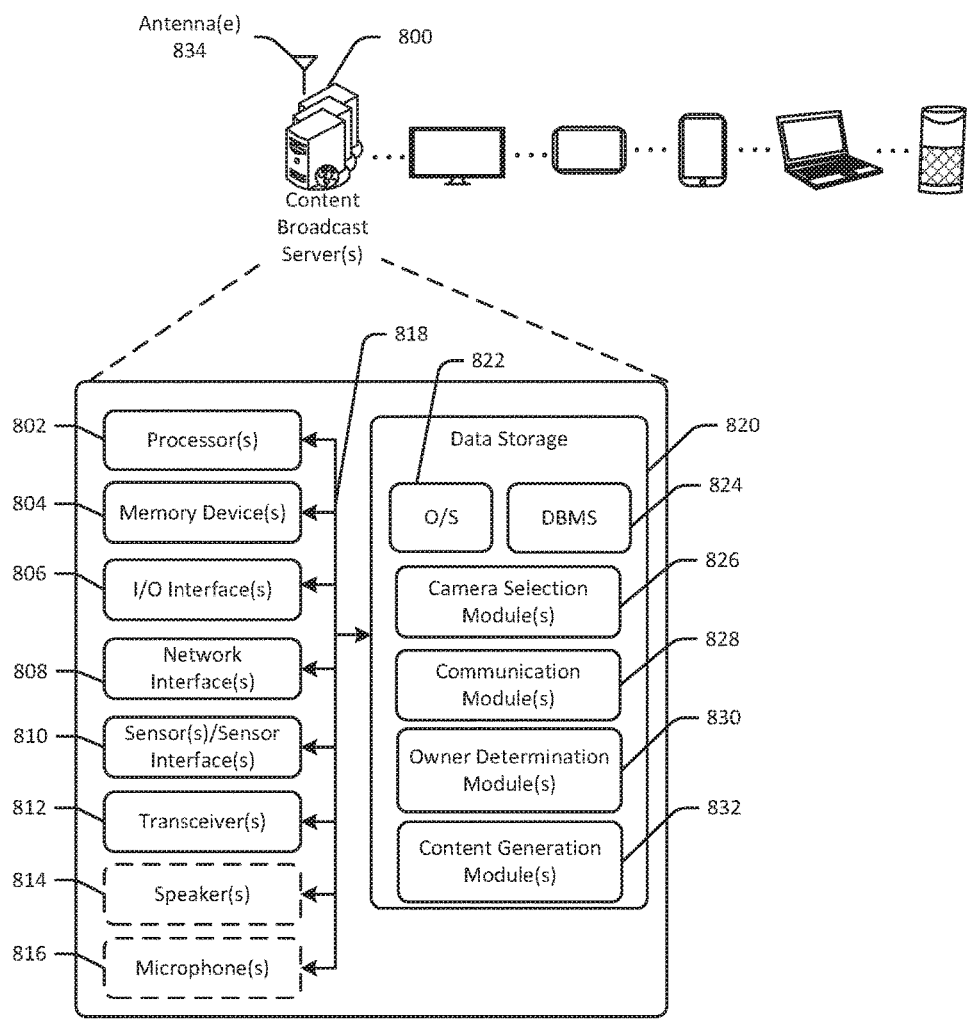
FIG. 8 schematically illustrates an example architecture of a content broadcast server in accordance with one or more embodiments of the disclosure.

FIG. 8 is a schematic block diagram of one or more illustrative content broadcast server(s) 800 in accordance with one or more example embodiments of the disclosure. The content broadcast server(s) 800 may include any suitable computing device including, but not limited to, a server system, a mobile device such as a smartphone, a tablet, an e-reader, a wearable device, or the like; a desktop computer; a laptop computer; a content streaming device; a set-top box; or the like. The content broadcast server(s) 800 may correspond to an illustrative device configuration for the content broadcast servers or remote servers of FIGS. 1-7.

The content broadcast server(s) 800 may be configured to communicate via one or more networks with one or more servers, user devices, or the like. The content broadcast server(s) 800 may be configured to determine product owners, select camera devices for content streaming or broadcastings, trigger actions at camera devices, generate notifications, send and/or receive data, and other operations. The content broadcast server(s) 800 may be configured to deliver or stream delivery of one or more pieces of content and may further be configured to control camera devices or ownership identifiers for certain products. In some embodiments, a single remote server or a single group of remote servers may be configured to perform more than one type of content delivery functionality.

The content broadcast server(s) 800 may be configured to communicate via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the content broadcast server(s) 800 may include one or more processors (processor(s)) 802, one or more memory devices 804 (generically referred to herein as memory 804), one or more input/output (I/O) interfaces 806, one or more network interfaces 808, one or more sensors or sensor interfaces 810, one or more transceivers 812, one or more optional speakers 814, one or more optional microphones 816, and data storage 820. The content broadcast server(s) 800 may further include one or more buses 818 that functionally couple various components of the content broadcast server(s) 800. The content broadcast server(s) 800 may further include one or more antenna(e) 834 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 818 may include at least one of a system bus, a memory bus, an address bus, or a message bus, and may permit exchange of information (e.g., data (including computer-executable code), signaling, etc.) between various components of the content broadcast server(s) 800. The bus(es) 818 may include, without limitation, a memory bus or a memory controller, a peripheral bus, an accelerated graphics port, and so forth. The bus(es) 818 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnect (PCI) architecture, a PCI-Express architecture, a Personal Computer Memory Card International Association (PCMCIA) architecture, a Universal Serial Bus (USB) architecture, and so forth.

The memory 804 of the content broadcast server(s) 800 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 804 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 804 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 820 may include removable storage and/or non-removable storage including, but not limited to, magnetic storage, optical disk storage, and/or tape storage. The data storage 820 may provide non-volatile storage of computer-executable instructions and other data. The memory 804 and the data storage 820, removable and/or non-removable, are examples of computer-readable storage media (CRSM) as that term is used herein.

The data storage 820 may store computer-executable code, instructions, or the like that may be loadable into the memory 804 and executable by the processor(s) 802 to cause the processor(s) 802 to perform or initiate various operations. The data storage 820 may additionally store data that may be copied to the memory 804 for use by the processor(s) 802 during the execution of the computer-executable instructions. Moreover, output data generated as a result of execution of the computer-executable instructions by the processor(s) 802 may be stored initially in the memory 804, and may ultimately be copied to the data storage 820 for non-volatile storage.

More specifically, the data storage 820 may store one or more operating systems (O/S) 822; one or more database management systems (DBMS) 824; and one or more program module(s), applications, engines, computer-executable code, scripts, or the like such as, for example, one or more camera selection module(s) 826, one or more communication module(s) 828, one or more owner determination module(s) 830, and/or one or more content generation module(s) 832. Some or all of these module(s) may be sub-module(s). Any of the components depicted as being stored in the data storage 820 may include any combination of software, firmware, and/or hardware. The software and/or firmware may include computer-executable code, instructions, or the like that may be loaded into the memory 804 for execution by one or more of the processor(s) 802. Any of the components depicted as being stored in the data storage 820 may support functionality described in reference to corresponding components named earlier in this disclosure.

The data storage 820 may further store various types of data utilized by components of the content broadcast server(s) 800. Any data stored in the data storage 820 may be loaded into the memory 804 for use by the processor(s) 802 in executing computer-executable code. In addition, any data depicted as being stored in the data storage 820 may potentially be stored in one or more datastore(s) and may be accessed via the DBMS 824 and loaded in the memory 804 for use by the processor(s) 802 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 8, an example datastore(s) may include, for example, historical data for campaigns, inventory data, campaign performance data, and/or other information.

The processor(s) 802 may be configured to access the memory 804 and execute computer-executable instructions loaded therein. For example, the processor(s) 802 may be configured to execute computer-executable instructions of the various program module(s), applications, engines, or the like of the content broadcast server(s) 800 to cause or facilitate various operations to be performed in accordance with one or more embodiments of the disclosure. The processor(s) 802 may include any suitable processing unit capable of accepting data as input, processing the input data in accordance with stored computer-executable instructions, and generating output data. The processor(s) 802 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 802 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 802 may be capable of supporting any of a variety of instruction sets.

Referring now to functionality supported by the various program module(s) depicted in FIG. 8, the camera selection module(s) 826 may include computer-executable instructions, code, or the like that responsive to execution by one or more of the processor(s) 802 may perform functions including, but not limited to, determining camera device or other device identifiers, determining devices associated with owner identifiers, selecting cameras for broadcasting video or images, triggering one or more actions at camera devices, causing video or images to be stored, and the like.

The communication module(s) 828 may include computer-executable instructions, code, or the like that responsive to execution by one or more of the processor(s) 802 may perform functions including, but not limited to, sending and/or receiving data, including content, sending and/or receiving instructions and commands, and the like.

The owner determination module(s) 830 may include computer-executable instructions, code, or the like that responsive to execution by one or more of the processor(s) 802 may perform functions including, but not limited to, determining an owner identifier for an owner of a product, determining an ownership history, determining camera devices associated with an owner identifier, determining location information for owners and/or camera devices, and the like.

The content generation module(s) 832 may include computer-executable instructions, code, or the like that responsive to execution by one or more of the processor(s) 802 may perform functions including, but not limited to, storing and/or processing digital content, selecting frames for presentation, selecting important and/or unimportant segments of content, creating compressed or shortened videos, and the like.

Referring now to other illustrative components depicted as being stored in the data storage 820, the O/S 822 may be loaded from the data storage 820 into the memory 804 and may provide an interface between other application software executing on the content broadcast server(s) 800 and the hardware resources of the content broadcast server(s) 800. More specifically, the O/S 822 may include a set of computer-executable instructions for managing hardware resources of the content broadcast server(s) 800 and for providing common services to other application programs (e.g., managing memory allocation among various application programs). In certain example embodiments, the O/S 822 may control execution of the other program module(s). The O/S 822 may include any operating system now known or which may be developed in the future including, but not limited to, any server operating system, any mainframe operating system, or any other proprietary or non-proprietary operating system.

The DBMS 824 may be loaded into the memory 804 and may support functionality for accessing, retrieving, storing, and/or manipulating data stored in the memory 804 and/or data stored in the data storage 820. The DBMS 824 may use any of a variety of database models (e.g., relational model, object model, etc.) and may support any of a variety of query languages. The DBMS 824 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the content broadcast server(s) 800 is a mobile device, the DBMS 824 may be any suitable lightweight DBMS optimized for performance on a mobile device.

Referring now to other illustrative components of the content broadcast server(s) 800, the input/output (I/O) interface(s) 806 may facilitate the receipt of input information by the content broadcast server(s) 800 from one or more I/O devices as well as the output of information from the content broadcast server(s) 800 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the content broadcast server(s) 800 or may be separate. The I/O devices may further include, for example, any number of peripheral devices such as data storage devices, printing devices, and so forth.

The I/O interface(s) 806 may also include an interface for an external peripheral device connection such as universal serial bus (USB), FireWire, Thunderbolt, Ethernet port or other connection protocol that may connect to one or more networks. The I/O interface(s) 806 may also include a connection to one or more of the antenna(e) 834 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, etc.

The content broadcast server(s) 800 may further include one or more network interface(s) 808 via which the content broadcast server(s) 800 may communicate with any of a variety of other systems, platforms, networks, devices, and so forth. The network interface(s) 808 may enable communication, for example, with one or more wireless routers, one or more host servers, one or more web servers, and the like via one or more networks.

The antenna(e) 834 may include any suitable type of antenna depending, for example, on the communications protocols used to transmit or receive signals via the antenna (e) 834. Non-limiting examples of suitable antennae may include directional antennae, non-directional antennae, dipole antennae, folded dipole antennae, patch antennae, multiple-input multiple-output (MIMO) antennae, or the like. The antenna(e) 834 may be communicatively coupled to one or more transceivers 812 or radio components to which or from which signals may be transmitted or received.

As previously described, the antenna(e) 834 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(e) 834 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(e) 834 may be configured to transmit or receive radio frequency signals within any suitable frequency range forming part of the unlicensed portion of the radio spectrum.

The antenna(e) 834 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 812 may include any suitable radio component(s) for—in cooperation with the antenna(e) 834—transmitting or receiving radio frequency (RF) signals in the bandwidth and/or channels corresponding to the communications protocols utilized by the content broadcast server(s) 800 to communicate with other devices. The transceiver(s) 812 may include hardware, software, and/or firmware for modulating, transmitting, or receiving—potentially in cooperation with any of antenna(e) 834—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 812 may further include hardware, firmware, or software for receiving GNSS signals. The transceiver(s) 812 may include any known receiver and baseband suitable for communicating via the communications protocols utilized by the content broadcast server(s) 800. The transceiver(s) 812 may further include a low noise amplifier (LNA), additional signal amplifiers, an analog-to-digital (A/D) converter, one or more buffers, a digital baseband, or the like.

The sensor(s)/sensor interface(s) 810 may include or may be capable of interfacing with any suitable type of sensing device such as, for example, inertial sensors, force sensors, thermal sensors, and so forth. Example types of inertial sensors may include accelerometers (e.g., MEMS-based accelerometers), gyroscopes, and so forth.

The speaker(s) 814 may be any device configured to generate audible sound. The microphone(s) 816 may be any device configured to receive analog sound input or voice data.

It should be appreciated that the program module(s), applications, computer-executable instructions, code, or the like depicted in FIG. 8 as being stored in the data storage 820 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the content broadcast server(s) 800, and/or hosted on other computing device(s) accessible via one or more networks, may be provided to support functionality provided by the program module(s), applications, or computer-executable code depicted in FIG. 8 and/or additional or alternate functionality. Further, functionality may be modularized differently such that processing described as being supported collectively by the collection of program module(s) depicted in FIG. 8 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 8 may be implemented, at least partially, in hardware and/or firmware across any number of devices.

It should further be appreciated that the content broadcast server(s) 800 may include alternate and/or additional hardware, software, or firmware components beyond those described or depicted without departing from the scope of the disclosure. More particularly, it should be appreciated that software, firmware, or hardware components depicted as forming part of the content broadcast server(s) 800 are merely illustrative and that some components may not be present or additional components may be provided in various embodiments. While various illustrative program module(s) have been depicted and described as software module(s) stored in the data storage 820, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

One or more operations of the methods, process flows, and use cases of FIGS. 1-7 may be performed by a device having the illustrative configuration depicted in FIG. 8, or more specifically, by one or more engines, program module(s), applications, or the like executable on such a device. It should be appreciated, however, that such operations may be implemented in connection with numerous other device configurations.

The operations described and depicted in the illustrative methods and process flows of FIGS. 1-7 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 1-7 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A method comprising:
    determining, by one or more computer processors coupled to at least one memory, a product identifier of a product for which to broadcast a product lifecycle video stream;
    determining a first owner identifier for a first owner of the product, wherein the first owner is a manufacturer of the product;
    determining a first camera at a manufacturer location using the first owner identifier, wherein the first camera captures a manufacturing process of the product;
    broadcasting a first live video stream of video from the first camera;
    determining that the product has been removed from the manufacturer location;
    determining a second owner identifier for a second owner of the product, wherein the second owner is a consumer of the product;
    determining a second camera at a home location using the second owner identifier, wherein the second camera captures storage of the product;
    broadcasting a second live video stream of video from the second camera;
    determining that the product has been removed from storage;
    determining a third camera using the second owner identifier, wherein the third camera is a mobile camera and captures usage of the product;
    broadcasting a third live video stream of video from the third camera;
    determining that the product has been placed in storage;
    broadcasting a fourth live video stream of video from the second camera;
    determining that the product has been consumed;
    ending live video streams of the product; and
    storing the first live video stream, the second live video stream, the third live video stream, and the fourth live video stream as a video file.

2. The method of claim 1, further comprising:
    determining a set of user identifiers of users viewing the third live video stream, wherein the third live video stream is presented with the product identifier;
    determining a number of units of the product sold to user identifiers in the set of user identifiers during the third live video stream; and
    attributing a portion of the number of units to the second owner identifier.

3. The method of claim 1, further comprising:
    determining an estimated product life, wherein a duration of the video file is equal to the estimated product life;
    determining an estimated rate of consumption of the product;
    determining a frame rate for at least a portion of the video file using the estimated rate of consumption;
    determining a first playback speed for a first portion of the video file that corresponds to the manufacturing process of the product;
    determining a second playback speed for a second portion of the video file that corresponds to storage of the product, wherein the second playback speed is greater than the first playback speed;
    determining a third playback speed for a third portion of the video file that corresponds to a change in appearance of the product, wherein the third playback speed is less than the second playback speed; and
    causing presentation of a summary video of the video file using the frame rate, the first playback speed, the second playback speed, and the third playback speed.

4. The method of claim 1, further comprising:
    determining a first portion of the video file corresponding to the manufacturing process of the product;
    determining a second portion of the video file corresponding to an on-sale process of the product;
    determining a third portion of the video file corresponding to an initial usage of the product;
    determining a fourth portion of the video file corresponding to an aging process of the product; and
    determining a fifth portion of the video file corresponding to an end of lifecycle stage of the product, wherein the video file is segmented by the first portion, the second portion, the third portion, the fourth portion, and the fifth portion.

5. A method comprising:
determining, by one or more computer processors coupled to at least one memory, a product identifier of a product for which a product lifecycle video is to be generated;
determining a first user identifier for a first owner of the product, wherein the first user identifier is associated with a first camera identifier;
determining a first camera to use for capturing a first portion of the product lifecycle video of the product using the first camera identifier, wherein the first portion corresponds to a first lifecycle stage of the product;
capturing the first portion;
determining a second user identifier for a second owner of the product, wherein the second user identifier is associated with a second camera identifier;
determining a second camera to use for capturing a second portion of the product lifecycle video of the product using the second camera identifier, wherein the second portion corresponds to a second lifecycle stage of the product;
capturing the second portion; and
causing presentation of the product lifecycle video.

6. The method of claim 5, further comprising:
causing a first live broadcast of the first portion; and
causing a second live broadcast of the second portion.

7. The method of claim 5, further comprising:
determining a first location of the product, wherein the first camera is associated with the first location;
determining that the first lifecycle stage is complete; and
determining a second location of the product, wherein the second camera is associated with the second location.

8. The method of claim 5, further comprising:
determining an estimated rate of consumption for the product; and
determining a frame rate for at least a portion of the video using the estimated rate of consumption.

9. The method of claim 5, further comprising:
determining a user identifier for a user of the product, wherein the user identifier is associated with the second camera;
determining a third camera associated with the user identifier; and
capturing a third portion of video of the product using the third camera instead of the second camera.

10. The method of claim 5, further comprising:
determining a number of purchases of the product while the second portion is captured; and
determining an attributed portion of the number of purchases to attribute to a first user account associated with the second camera.

11. The method of claim 10, wherein the second portion is broadcast live.

12. The method of claim 10, wherein the attributed portion is a first attributed portion, the method further comprising:
determining a second attributed portion of the number of purchases to attribute to a second user account associated with the first camera.

13. The method of claim 10, further comprising:
determining user identifiers of viewers of the second portion;
wherein determining the number of purchases of the product while the second portion is captured comprises determining the number of purchases of the product by the user identifiers while the second portion is captured.

14. The method of claim 5, further comprising:
receiving a search query for the product identifier;
determining a set of broadcasts and videos in response to the search query, the set of broadcasts and videos comprising the video; and
causing presentation of at least a portion of the set of broadcasts and videos, wherein the set of broadcasts and videos are sorted by lifecycle stage and a number of viewers of the respective broadcasts and videos.

15. The method of claim 5, wherein the first lifecycle stage is a manufacturing stage, the method further comprising:
determining a user identifier of a user that purchased the product; and
sending a notification to a user account associated with the user identifier indicating that the first portion of the video is being captured.

16. The method of claim 5, wherein causing presentation of the video comprises causing presentation of the video in real-time.

17. The method of claim 5, wherein at least one of the first camera or the second camera is a mobile device.

18. A device comprising:
at least one memory that stores computer-executable instructions; and
at least one processor configured to access the at least one memory and execute the computer-executable instructions to:
determine a product identifier of a product for which a product lifecycle video is to be generated;
determine a first user identifier for a first owner of the product, wherein the first user identifier is associated with a first camera identifier;
determine a first camera to use for capturing a first portion of the product lifecycle video of the product using the first camera identifier, wherein the first portion corresponds to a first lifecycle stage of the product;
capture the first portion;
determine a second user identifier for a second owner of the product, wherein the second user identifier is associated with a second camera identifier;
determine a second camera to use for capturing a second portion of the product lifecycle video of the product using the second camera identifier, wherein the second portion corresponds to a second lifecycle stage of the product;
capture the second portion; and
cause presentation of the product lifecycle video.

19. The device of claim 18, wherein the at least one processor is further configured to access the at least one memory and execute the computer-executable instructions to:
cause a first live broadcast of the first portion; and
cause a second live broadcast of the second portion.

* * * * *